P. DAIMLER.
CARBURETER.
APPLICATION FILED JUNE 10, 1912.
1,098,783.
Patented June 2, 1914.
2 SHEETS—SHEET 1.
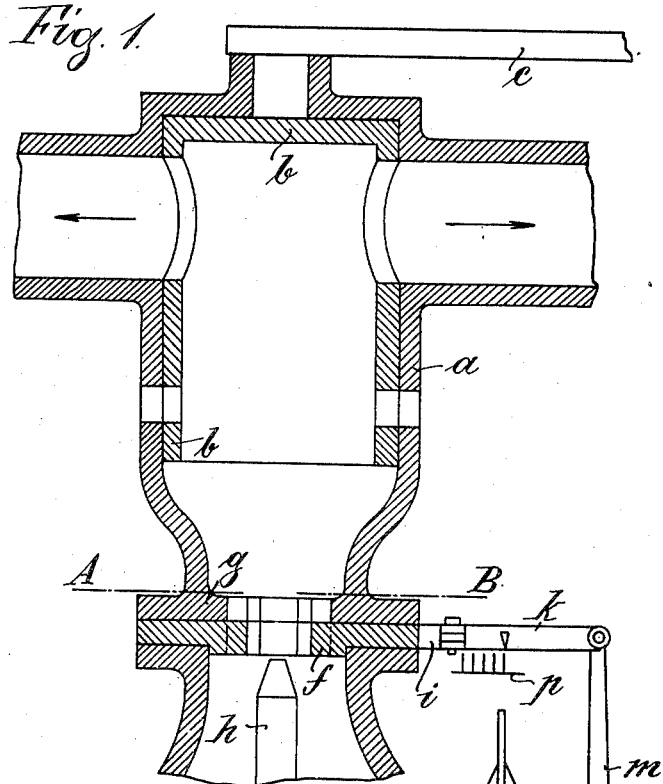
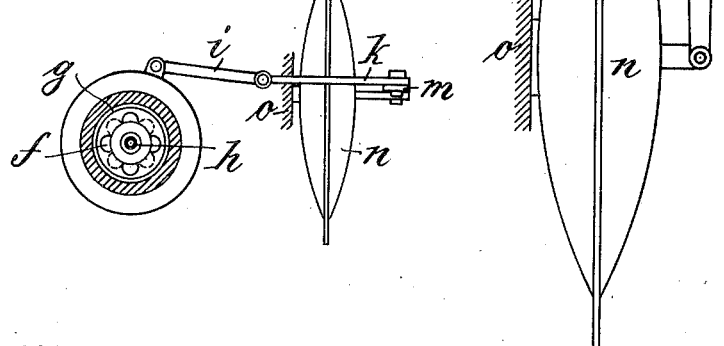
Witnesses:
L. H. Cadarr.
C. P. Brown
Inventor
Paul Daimler
by
Foster Freeman Watson & Coit
Attorneys

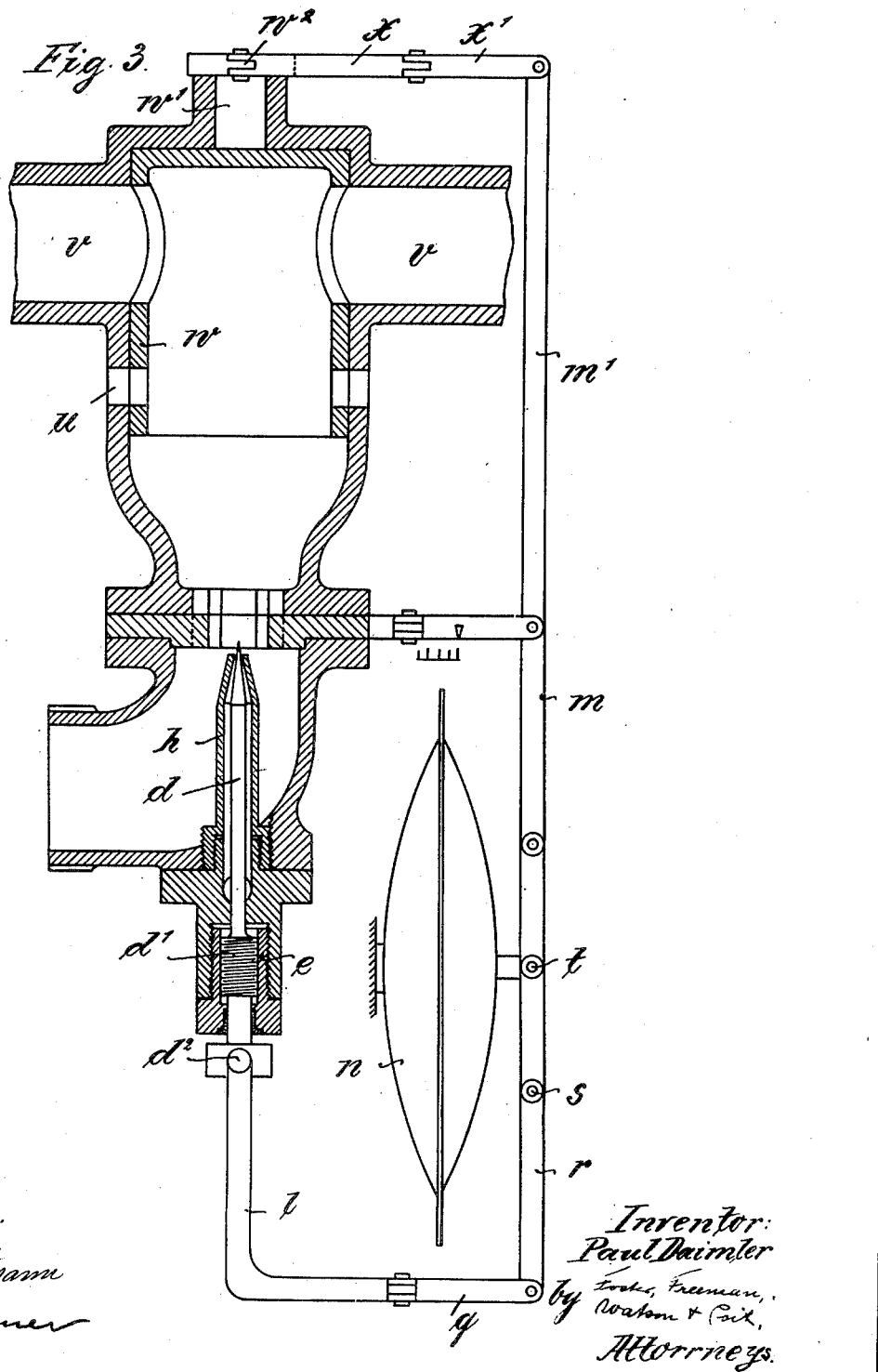

UNITED STATES PATENT OFFICE.

PAUL DAIMLER, OF CANNSTATT, GERMANY, ASSIGNOR TO THE FIRM OF DAIMLER-MOTOREN-GESELLSCHAFT, OF UNTERTURKHEIM-STUTTGART, GERMANY.

CARBURETER.

1,098,783.  Specification of Letters Patent.  Patented June 2, 1914.

Application filed June 10, 1912. Serial No. 702,805.

*To all whom it may concern:*

Be it known that I, PAUL DAIMLER, a subject of the King of Wurttemberg, and resident of 87 Waiblingerstrasse, Cannstatt, in the Kingdom of Wurttemberg, Germany, have invented a new and useful Valve Mechanism for Carbureters, of which the following is a specification.

This invention relates to mechanism for automatically regulating or controlling the carbureters of internal combustion engines, and particularly those used in conjunction with aeronautical vessels, but which may also be employed in conjunction with the carbureters of automobiles and the like.

It has been found that the action of the carbureter varies in accordance with changes in the surrounding atmospheric pressure, and this fact has to be taken into consideration more especially in the case of aeronautical vessels which move at different altitudes, but it also has to be considered in the case of automobiles and the like which are used in mountainous districts, where considerable differences in altitude frequently occur.

According to the present invention, in order to adapt the carbureter to the particular barometric pressure, a device is provided which is actuated by the varying barometric pressure and is connected with one or more regulating devices of the carbureter, so that the carbureter is controlled automatically according to the prevailing barometric pressure. The device preferably comprises an inclosed flexible chamber or apparatus of barometric type. It is preferable to provide the mechanism with a scale corresponding to different altitudes so that the driver can at any time ascertain whether the apparatus is properly working, and also to enable the regulating of the carbureter to be effected by hand, should the automatic mechanism get out of order. The automatic actuating mechanism may be adapted to control either the main or secondary air supply or the supply of mixture to the engine or the cross sectional area of the fuel nozzle. The latter may be controlled either individually or simultaneously and if required in opposite direction according to particular requirements.

In order to make my invention more clear, reference is made to the accompanying drawings, which show two embodiments of the invention by way of example.

Figure 1 is a side view showing the upper part of a carbureter in section and having my invention applied to the valve for regulating the main air supply. Fig. 2 is a plan view partly in section on the line A—B on a somewhat reduced scale. Fig. 3 is a sectional elevation of a carbureter showing means for simultaneously regulating the main and supplementary air supply and the supply of fuel to the nozzle and mixture to the engine.

In the casing $a$ of the carbureter is arranged a rotatable cylindrical valve $b$ which serves for regulating the supply of secondary air and of the mixture to the engine and is operated in the usual manner by means of a hand lever $c$. The main air supply is regulated by means of a rotatable disk valve $f$ which is provided with a central scalloped opening which registers with a corresponding opening in the stationary part $g$ of the casing of the carbureter. As soon as the scalloped edges of the two openings coincide, the cross sectional area of the opening for the passage of air past the fuel nozzle $h$ is greatest while when the scalloped edges of the slide valve $f$ lie between those of the stationary part $g$ the passage is reduced. The rotatable slide-valve $f$ is connected by means of rods $i$ and $k$, and a double-armed and pivoted lever $m$ with a flexible chamber $n$ which is supported at one side by means of any suitable fixed part $o$. As illustrated in Fig. 3 the flexible chamber $n$ may also be adapted to simultaneously regulate the additional air-supply as well as the supply of mixture to the engine and of fuel to the nozzle $h$. For this purpose the needle $d$ of the nozzle $h$ is provided with a screwed part $d'$ threaded in a fixed nut $e$, the lower end of the needle $d$ carrying a lateral pin or the like $d^2$ to which is connected a crank arm $l$ articulated to a link $q$ which is articulated to a lever $r$ pivoted at $s$ and articulated at its other end at $t$ to the flexible chamber $n$. It will thus be seen that expansion or contraction of the flexible chamber $n$ will cause the crank arm $l$ to rotate the needle $d$ and thus screw the part $d'$ into or out of the fixed nut $e$. The additional air supply ports $u$ and the connections $v$ supplying the mixture to the engine are adapted to be controlled by a rotatable cylindrical ported valve $w$, having an upwardly projecting pin $w'$ connected by means of a lateral arm $w^2$ to a link $x$ articulated to a link $x'$ which is articulated to an extension $m'$ of the pivoted lever $m$, so that the expansion or contraction of the flexible chamber $n$ causes the valve $w$ to be rotated. The flexible chamber $n$ can also be of any other suitable form or be replaced by any other device which is automatically influenced by variations in barometric pressure.

The device may be provided with a scale $p$, Fig. 1, to indicate the position corresponding to different heights and by the aid of this scale, the valve $f$ may be regulated by hand should the automatic device fail to act.

It will be clear from the foregoing description that the flexible chamber $n$ will respond to variations in the barometric pressure, being compressed when the barometric pressure increases and expanding when the pressure decreases, the movements of the flexible walls being transmitted to the valves through the mechanism hereinbefore described, thereby regulating the carbureter according to the variations in barometric pressure, so that, as the pressure decreases with increasing altitude, the main and secondary air supply will be more and more throttled by the valves $f$ and $w$, while the fuel supply is gradually increased by the further opening of the needle valve $d$, whereas the valves $f$ and $w$ will be further opened and the valve $d$ gradually closed as the pressure increases with decreasing altitude.

I claim:—

1. Means for automatically controlling the regulating mechanism of carbureters subjected to varying atmospheric pressure, comprising a device directly actuated by the variation in barometric pressure and independent of the suction in the carbureter and a connection between said device and the regulating mechanism of the carbureter.

2. Means for automatically controlling the regulating mechanism of carbureters subjected to varying atmospheric pressure, comprising a flexible chamber directly actuated by the variation in barometric pressure and independent of the suction in the carbureter and a connection between said flexible chamber and the regulating mechanism of the carbureter.

In witness whereof I have hereunto set my hand in the presence of two witnesses.

PAUL DAIMLER.

Witnesses:
 ROBERT UHLAND,
 ERNEST ENTENMANN.